United States Patent [19]

Bjorklund

[11] 4,142,707
[45] Mar. 6, 1979

[54] VALVE ARRANGEMENT

[76] Inventor: Curt A. Bjorklund, Box 99, Ulricehamn, Sweden

[21] Appl. No.: 773,730

[22] Filed: Mar. 2, 1977

[30] Foreign Application Priority Data

Mar. 15, 1976 [SE] Sweden .............................. 7603251

[51] Int. Cl.² ...................... F16K 31/02; F16K 31/08; B65D 25/40
[52] U.S. Cl. ...................................... 251/77; 251/138; 222/571
[58] Field of Search ........................... 251/76, 77, 138; 222/571

[56] References Cited

U.S. PATENT DOCUMENTS 2,868,494  1/1959  Kearns, Jr. et al. ................... 251/77
2,978,145  4/1961  Lyman ................................ 222/146

Primary Examiner—Martin P. Schwadron
Assistant Examiner—A. Michael Chambers
Attorney, Agent, or Firm—Fred Philpitt

[57] ABSTRACT

The present invention relates to a specially designed valve for incorporation in a fuel line between a pump and burner nozzle. In a preferred embodiment my valve device sucks back a limited amount of fluid after the valve is shut off.

16 Claims, 12 Drawing Figures

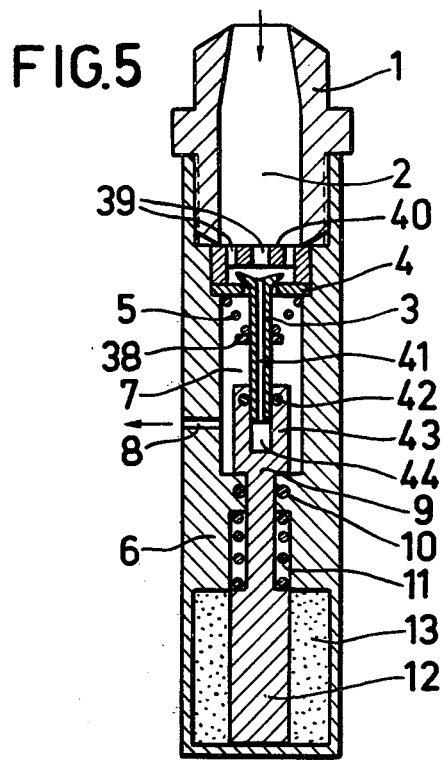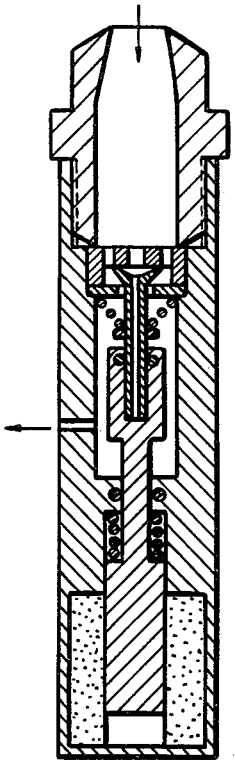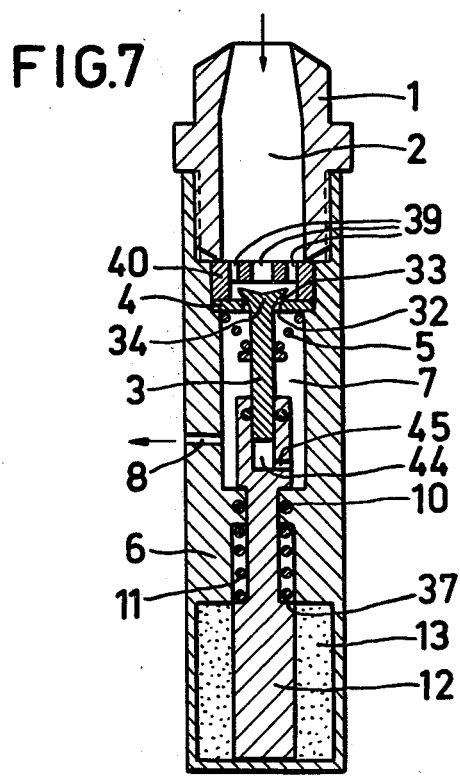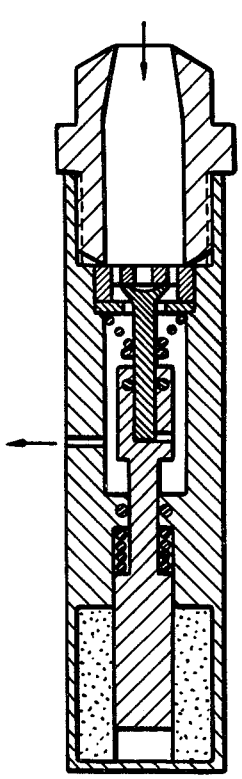

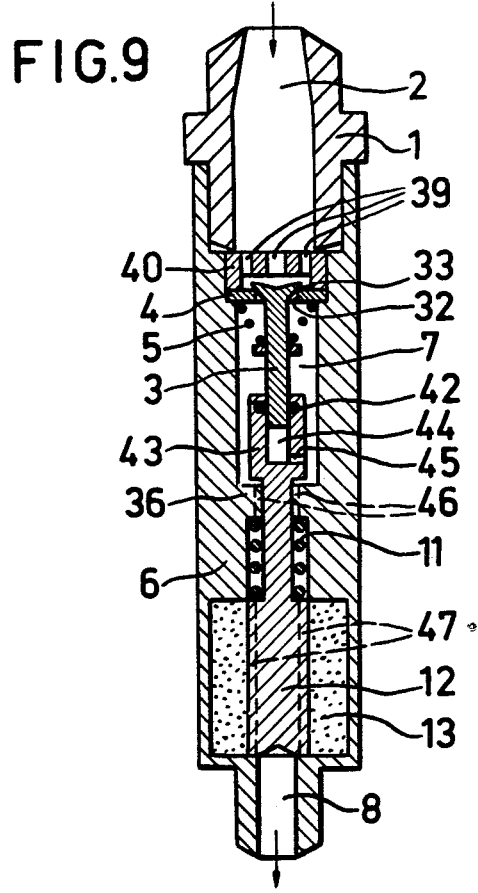
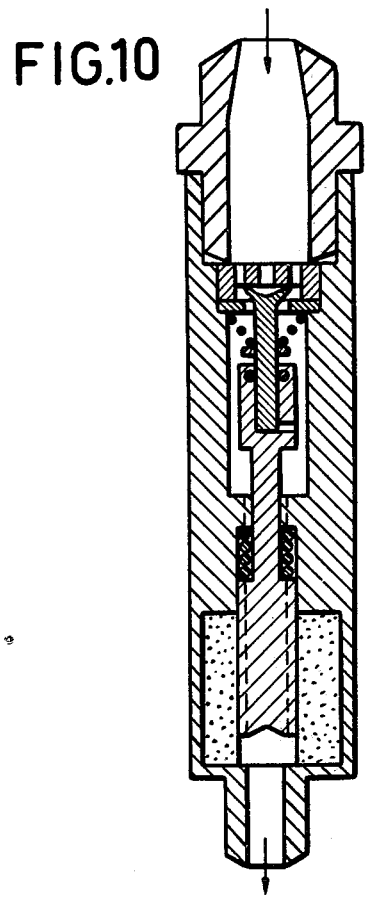
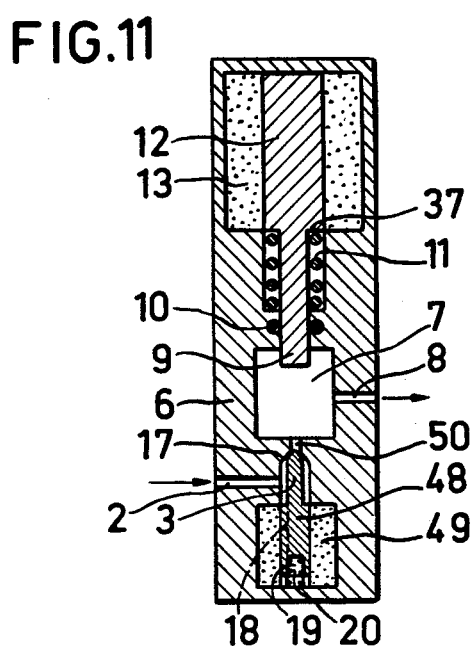
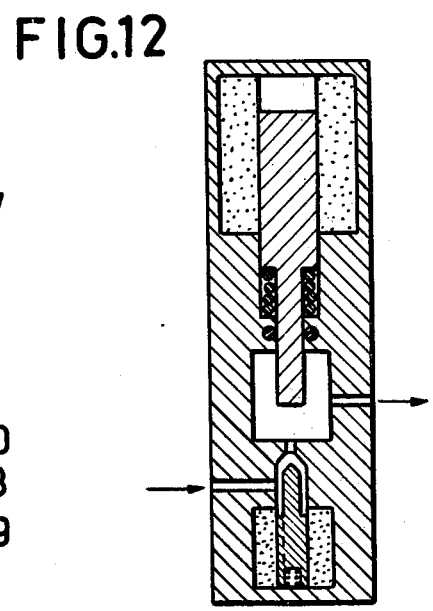

VALVE ARRANGEMENT

THE PRESENT INVENTION

The features and advantages of the invention are set forth by the following description with reference to the accompanying drawings, which are longitudinal sectional views wherein;

FIGS. 5 and 6 represent a third embodiment according to the invention in a position of rest and then in a working position;

FIGS. 7 and 8 represent a fourth embodiment according to the invention in a position of rest and then in a working position;

FIGS. 9 and 10 represent a fifth embodiment according to the invention in a position of rest and then in a working position; and FIGS. 11 and 12 represent a sixth embodiment according to the invention in a position of rest and then in a working position.

Figure 1:
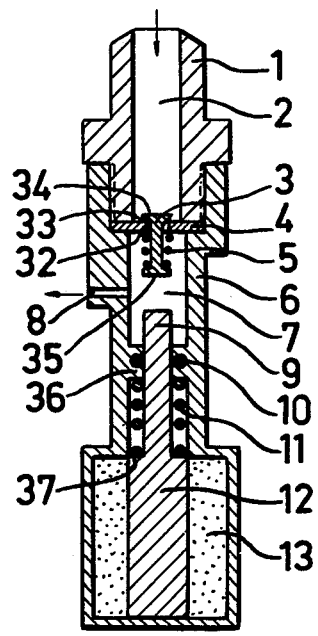
FIGS. 1 and 2 represent a first embodiment according to the invention in a position of rest and then in a working position.
Figure 2:
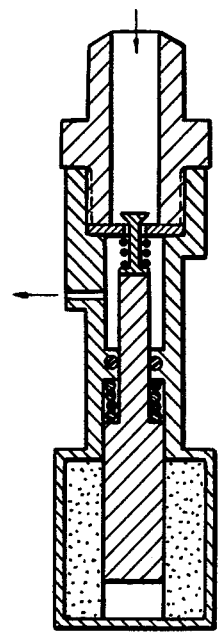

In FIGS. 1 and 2 a valve casing indicated at 6 encloses a chamber 7, to the end of which a threaded nipple 1 containing an inlet passageway 2 is connected. The end of nipple 1 holds the washer 4 in place in the valve casing 6 to thereby form one end of the chamber 7. The center of the washer 4 contains at its center a through-opening 32 forming a seat 33 for a valve member 3 which extends through the opening 32. The valve member 3 preferably has the shape of a rod and consequently extends through the opening 32 in order to, on the inlet side, form a head 34 which diverges toward the inlet passageway 2. The head 34 in its closed position bears with its conical part against the seat 33. The valve member 3 extends into the chamber 7 and has at its lower end a perimetrical flange or the like 35. Between the flange 35 and the washer 4, a pressure spring is arranged, e.g. in the form of a helical spring 5, which consequently has a tendency to hold the valve member 3 and head 34 to the closed position.

An outlet 8 may lead to a burner nozzle (not illustrated) and preferably branches off in a direction transverse to the central area of the valve chamber 7. The inlet passageway 2 can be connected to a pump (not illustrated) which in turn can be connected to a storage tank (not illustrated) for e.g. oil.

A piston 9 communicates with the valve chamber 7 on the side opposite the valve member 3 and extends into the valve chamber 7 through the wall of the valve chamber that is opposite the washer 4. Piston 9 is preferably part of a magnet core 12. Confined in the valve chamber, and within the wall 36 of the valve housing which encircles the piston 9, a seal 10 can be arranged, e.g. in the form of an o-ring which encircles the piston. Between wall 36 of the valve housing and a shelf-like enlargement 37 of the piston 9 or the magnet core 12, a return spring 11 is arranged, e.g. in the form of a screw-shaped pressure spring. Finally, a magnet solenoid encircling magnet core 12 is indicated at 13.

As is shown in FIGS. 1 and 2, the valve member 3 and the piston 9 are situated in line and are arranged at certain definite distances from one another.

In this embodiment, the spring pressure on the valve member 3 is limited by the strength in the spring 5 for sealing against the washer 4. This spring pressure moreover constitutes a greater need for the magnet parts locking strength in open or working position according to FIG. 2.

The method of operation of such a valve is as follows: In the position of rest as shown in FIG. 1, a so-called preliminary blowing operation of the oil burner can take place, whereby the pressure in the inlet passageway 2 influences the conical head 34 of valve member 3 (i.e., which depresses it) which contributes to obtaining a secure seal. When e.g. the preliminary blowing operation is completed, current is supplied to the solenoid 13 which causes the core 12 with the piston 9 to move upward, whereby the piston 9 penetrates farther into the chamber 7, thus reducing the volume in chamber 7 and which causes a quantity of the fuel oil to be forced out the outlet 8 and in the final phase of its upward movement, strikes against the flange 35 and pushes the entire valve member 3 up into the inlet passageway 2, whereby the head 34 is lifted away from the seat 33, as is shown in FIG. 2, and the fuel oil can then flow from the inlet passageway 2 through the opening 32, the valve chamber 7 and out through the outlet 8 to a burner nozzle or the like. In this connection the holding strength of the magnet 12 is sufficiently great to oppose both the downward pressures of the springs 5 and 11 as well as the pressure of the fuel medium in the inlet 2. The diameter of head 34 where it bears against the seat 33 should not be greater than the diameter of the piston 9, so that extra power will not be needed to lift the valve member 3 away from its seat, in which connection the piston 9 is influenced by the pressure of the fuel oil corresponding to its cross sectional area.

When the supply of fuel oil is to be interrupted, current to the solenoid 13 is cut off, whereby the springs 5 and 11 in combination with the pressure of the fuel oil quickly return the valve member 3 to the closed position shown in FIG. 1. In the beginning of this movement, the aforesaid three power components work together, rendering a very rapid and effective closure. The piston 9 with magnet core 12 returns to its initial drawn-in position, thus increasing the effective volume of chamber 7, which causes a corresponding quantity of fuel oil to be sucked in from the outlet 8 and consequently from the burner nozzle. This sucked-in quantity preferably corresponds to the volume of the oil present in the burner nozzle, which is warmed up by the hot nozzle and its hot surroundings. Such-back is consequently very little, which is essential in order to guarantee that the next combusion will start rapidly and effectively and without the clatter caused by the inconveniences which can arise when a greater part of the system is emptied of oil and filled with air. These inconveniences are consequently avoided owing to the above described construction, which guarantees an extremely fast cut off and suck-back at the termination of combustion and guarantees a problem-free new combustion start.

Figure 3:
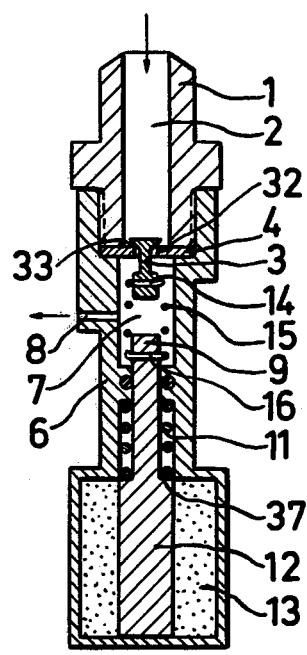
FIGS. 3 and 4 represent a second embodiment according to the invention in a position of rest and then in a working position.
Figure 4:
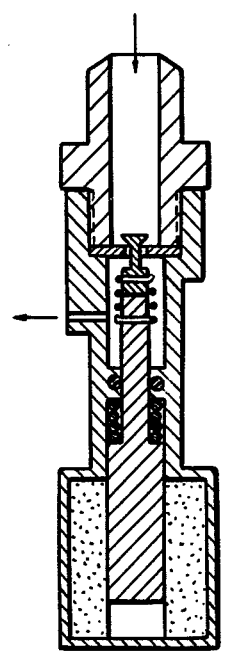

The embodiment according to FIGS. 3 and 4 resembles to a great extent the embodiment of FIGS. 1 and 2, but differs from it in that the spring 5 is replaced by a spring 15, preferably a screw-shaped tension spring, which connects the valve member 3 with the piston 9, the ends of spring 15 being tucked in transversal holes 14 and 16 of valve member 3 and piston 9. The pressure spring 11 is much stronger than the tension spring 15 and overcomes the latter's strength, so that the magnet core 12 in a position of rest assumes a completely drawn down position despite the tension of spring 15. In a position of rest, the spring 11 guarantees that the tension spring 15 will be held in an extended position, which insures closure of the valve member 3. In addition, closure is influenced by the pressure of the liquid medium in inlet passageway 2. The spring 11 is so balanced and dimensioned, that at the start of the operation i.e., at the transition from a position of rest to the working position generally corresponds to the transition.

The working position according to FIG. 4 shows that the tension spring 15 holds the valve member together with the piston, by what can be considered as a sort of balancing. Here one has the advantage of a greater closing power, thanks to a positive cooperation between the three stated components. In practice this means that the magnet solenoid can be made smaller and less current consumption occurs, and that the spring 11 can have less strength than spring 11 of FIG. 1, which particularly applies to the spring's compressed position, in which less strength is needed, since the pressure from a spring 5 does not have to be overcome.

The embodiment according to FIGS. 5 and 6 resembles to a great extent the embodiment according to FIGS. 1 and 2, but with the following differences. In addition to a washer 4, a stop washer 40 with holes 39 is provided between the nipple 1 and the valve housing 6. The stop washer 40 is fastened between washer 4 and the nipple 1. Its central part is also somewhat spaced from the washer 4 in order to allow the necessary opening movement for the valve member 3. The holes 39 are preferably both located in the center and in the peripheral area of washer 40.

The spring 5, which preferably is screw-shaped with a wider base bearing against the washer 4, supports itself with its other end against a stop 38 projecting from the valve member 3. The valve member 3 itself can be larger than that in both the previously described embodiments and is also preferably longer. According to a special and preferred embodiment, the valve member 3 has an axial through-channel 41. The end of valve member 3 that is situated near the piston 9 is guided and encircled by the piston by means of a cylindrical piston end section 43, which is open on its upper side in order to admit the valve member 3, and an o-ring or similar seal 42 encircles the valve member 3. The cylindrical piston end section 43 is the part of piston 9 which pushes into the chamber 7. In the position of rest shown in FIG. 5, in which the magnet core 12 and the piston 9 are drawn down, a piston chamber 44 is formed in the cylindrical end section 43 into which the valve member 3 penetrates to a limited extent. One end of channel 41 opens into this piston chamber 44.

This valve functions and operates in the following manner: In the position of rest shown in FIG. 5, the piston chamber 44 and the channel 41 are filled with fuel medium, for example oil, and when the solenoid 13 is activated, the core 12 with the piston 9 is moved upwardly, whereby the pressure in the piston chamber 44 quickly and greatly increases, and the fluid enclosed in the piston chamber 44 is not in a position to be quickly pressed out through the narrow channel 41 to inlet 2. Also, spring 5 does not have the strength (nor the capability in conjunction with the liquid pressure in the inlet and the obstacle in the form of the channel's 41 narrowness) to retain the valve member 3 in the position shown in FIG. 5, and as a consequence, because of the greatly increasing pressure in the piston chamber 44, the valve member 3 quickly and almost immediately moves upwardly to the open or working position shown in FIG. 6 so that valve member 3 will bear against the stop washer 40. This contact stops the upward movement of valve member 3, but the energy emitted from the magnet solenoid 13 is still sufficiently great so that the upward movement of piston 9 and end part 43 will continue, whereby fluid which is present in the chamber 44 will be forced up the channel 41 and out to the inlet 2.

When the current to the solenoid 13 is cut-off, the pressure of the incoming fluid in inlet 2 and the force of return springs 5 and 11 go into action so that the valve member 3 closes rapidly and effectively. When the valve member 3 reaches its seat, the piston chamber 44 does not immediately return to the volume shown in FIG. 5. Instead, the liquid pressure from the inlet 2, which pressure is transmitted through the channel 41 and expands into the valve chamber 44, so that the pressure from the inlet fluid affects the piston 9 and the core 12, which in conjunction with the return spring 11, rapidly to the initial position shown in FIG. 5.

The construction of FIGS. 5 and 6 offers the great advantage in that the initial phases of the piston's pushing out and drawing in motion cause immediate and effective opening and closing of the valve. Owing to the piston chamber 44, despite the stated advantages e.g. during closure, no cross interruption is achieved in the liquid flow from e.g. a pump. Instead this liquid flow is elastically captured by the piston chamber 44, which expands in direct connection with closure of the valve member 3. In this manner the flow passages ahead to the valve, the valve itself also and the members connected to the stated flow passages are taken care of.

It is furthermore optional with this valve, as to whether there will be suck-back out of the outlet line 8 in conjunction with valve closure. If the valve member 3 is given the same cross-sectional area as the piston 9, no suck-back occurs. However, if the piston 9 is given a cross-sectional area that is greater than that of the valve member 3, the volume in the chamber 7 increases with the result that a small quantity of liquid is sucked back in the outlet 8 and away from the burner nozzle. The cylindrical end section 43 does not need to be formed by means of an enlargement of the piston 9 and it can instead pass on straight to the end section 43 and there encircle the piston chamber 44. In such a case, a suck-back is obtained.

The embodiment according to FIGS. 7 and 8 resemble to a great extent the embodiment of FIGS. 5 and 6, but the bottom of the piston chamber 44 is connected to the chamber 7 via a passage 45. In this embodiment the channel 41 is preferably left out. The passage 45 preferably has a relatively small cross sectional area so that the fluid present in the piston chamber 44 during opening of the valve cannot force its way out through the passage 45 before the valve member 3 has been lifted away from its seat. However, during the continued upward movement of the piston 9, fluid present in the chamber 44 is pressed out through the passage 45 and into the chamber 7. During closure of the valve, the piston chamber 44 functions as a suck-back chamber in conjunction with the valve members bearing down against its seat, after which the chamber 44 expands as described. in this case, the magnet core can be chosen with a relatively short stroke length, e.g. only half as large compared with that of the previous embodiment, in order to reach the same efficiency.

The embodiment shown in FIGS. 9 and 10 is related to the embodiment according to FIGS. 7 and 8 but primarily lack an outlet 8 branched off from the chamber 7. Axial grooves or other channels 46 are instead arranged to the wall section 36 adjacent to the piston 9, from which the passage of liquid occurs via the area in the valve housing containing the spring 11 and through grooves or channels 47 adjacent the periphery of the magnet core 12 in order to eventually reach the outlet 8, which is axially connected to the magnet core on the side facing away from the return spring 11. In this embodiment a seal 10 is left out. This is considered to be a great advantage, since the problem of completely dependably sealing during a long period of time at 10 is very difficult to overcome. Another advantage with this embodiment is that the fluid on its way to the outlet 8 cools the magnet core 12 and the solenoid 13 at the same time that the fluid, for example oil, gains higher temperature, better atomizing properties and e.g. better combustion. Of course, with this embodiment it would also be possible to discard the outlet 8 shown in the FIGS. 9 and 10 and instead arrange the outlet transversely in the chamber 7 through the valve housing 6 while at the same time retaining the channels or the like 46 and 47, so that the magnet core 12 and the magnet solenoid 13 still come into contact with the fluid. However, by so doing the described cooling respectively warming effect would be lost.

The embodiment according to FIGS. 11 and 12 partially resembles the embodiment according to FIGS. 1 and 2, taking into consideration the features of the magnet core 12 and the piston 9, as well as related and surrounding parts. However, the valve member 3 is here the extension of a magnet core 48, which is encircled by a solenoid 49. The valve member preferably lines in line with the piston 9 and is directed toward it, whereby the piston is encircled by the inlet passage 2, which before the passing on to the chamber 7 forms a channel 50, whose end near the valve member is shaped as a conical seat 17. The end of the valve member 3 which faces the seat has in this case a corresponding shape.

It can be advantageous to arrange an axial groove 18 in the magnet core 48, which connects the inlet with a space 19 behind or in the magnet core 48, where a pressure spring 20 is arranged. In this manner the magnet core 48 and the solenoid 49 are exposed to the fluid which is to be regulated.

This valve functions in the following manner: In the position shown in FIG. 11, the valve member 3 cuts off passage of the fluid through the valve. When feeding of the fluid is then to begin, electric current is supplied to the magnet solenoids 13 and 49, whereby the magnet core 12 and the piston 9 travel in a direction toward the chamber 7, where the piston 9 constricts a certain volume quantity. The magnet core 48 with the valve member 3 travel simultaneously in the same direction, i.e., away from the chamber 7 and free passage of the fluid from the inlet 2 to the chamber 7 and out through the outlet 8.

When supply of the fluid is to be interrupted again, supply of current to both of the magnet solenoids is cut off, signifying that the magnet core 48 is pushed out of its solenoid and travels with the valve member 3 to bear against the seat 17 and by that means block the flow of fluid through the valve. The magnet core 12 is simultaneously drawn into the solenoid 13, whereby the piston 9 guarantees an increase of volume in the chamber 7, which is compensated in that a small quantity of fluid is sucked out of the outlet 8 and by that means aways from a burner nozzle.

As revealed by the figures in the drawings, the dimensions of the valve member 3 and its stroke length are considerably smaller than corresponding dimensions of the piston 9. In a practical example of the embodiment, the valve member's stroke length can be 0.5 mm and the pistons stroke length can be 6 mm. From this it follows that even without timing relays or the like, the valve member 3 closes considerably faster than the piston 9 travels to its initial position. Consequently, suck-back out of the outlet 8 is guaranteed.

If the outlet 8 and parts connected to it offer resistance while the piston 9 pushes into the chamber 7 in connection with opening the valve, a certain backward moving flow of the fluid can eventually occur, i.e., into the inlet 2 and parts connected to it, i.e., fluel line and pump, where an intrinsically known pressure regulation apparatus can compensate this pressure directed in a backward direction, after which an even flow can occur through the entire system.

Of course, the magnet core 12 by means of a corresponding groove or the like in the valve housing, can also be exposed to the fluid, whereby a special suck-back chamber e.g. according to the piston chamber 44 shown in FIGS. 9 and 10, can be arranged if suck-back is desired, whereby the eventual cylindrical end part can be arranged in stationary position or be arranged at the end of the piston 9 in order to cooperate with a stationary part corresponding to the valve members 3 and present in the valve member 7, as is shown in FIGS. 9 and 10.

The valve member 3 with magnet core 48 and solenoid 49 shown in FIGS. 11 and 12, can also be replaced by a conventional so called cut-off valve, which e.g. is hydraulically driven.

The forms of the embodiment described above and illustrated in the drawings are only to be considered as non-limiting examples, which can be modified and supplemented at will within the scope of the inventive idea and the following patent claims.

I claim:

1. A device for insertion between the outlet of a fluid pump and the fluid inlet to a burner nozzle, said device comprising in combination
   (1) a fluid chamber having bottom, side and top walls that are all stationary,
   (2) a fluid inlet in the top of said fluid chamber, said fluid inlet being adapted to be connected to a pump,
   (3) a fluid outlet in a sidewall of said fluid chamber, said fluid outlet being adapted to be connected to a burner,
   (4) a valve member in said fluid inlet, said valve member having one end that extends downwardly through the top wall of said fluid chamber and into the interior of said fluid chamber,
   (5) a piston member having one end that extends upwardly through the bottom wall of said fluid chamber, said one end of said valve member and said one end of said piston member being axially aligned with each other and establishing a space that varies in volume depending upon the relative movement of the two ends,
   (6) a magnetic core attached to one end of said piston member, and
   (7) a magnetic solenoid surrounding said magnetic core, said valve member and said piston member being mounted so that they cooperate to sequentially:
(a) unseat said valve member so that fluid can flow through said fluid inlet, and
(b) seat said valve member when fluid flow is no longer desired and suck back a limited amount of fluid from said fluid outlet into said fluid chamber by virtue of the withdrawal of a portion of the piston member from said fluid chamber.

2. A device according to claim 1 wherein a valve seat is provided in said fluid inlet to receive said valve member.

3. A device according to claim 2 characterized in that said valve seat is formed by a washer which is arranged between said inlet passageway and said chamber, said washer containing an opening whose encircling wall material forms said valve seat.

4. A device according to claim 3 wherein said valve member extends from said chamber through said washer opening and on the inlet side of said washer has a head portion that diverges toward said inlet, said head having a cone-like shape with a base of larger diameter than that of said washer opening that bears against said seat in the closed position.

5. A device according to claim 2 wherein said valve member has one end that extends a bit into said fluid chamber, said end having a radially extending flange, and a spring that extends between said flange and said valve seat so as to bias said valve member to a closed position.

6. A device arrangement according to claim 2 wherein a portion of said piston is encircled by a return spring which biases said piston to a withdrawn position with respect to said fluid chamber.

7. A device arrangement according to claim 6 wherein said valve member and said piston are interconnected by a second spring, the strength of said second spring being less than that of said return spring.

8. A device arrangement according to claim 2 which includes a stop adjacent the inlet side of said valve seat, said stop being in the form of a washer provided with holes.

9. A device arrangement according to claim 2 wherein the end of the valve member nearest the piston is encircled and guided by a cylindrical end section of the piston that constitutes a piston chamber.

10. A device arrangement according to claim 9 characterized in that said piston chamber communicates with said inlet passageway by means of a channel extending longitudinally through the valve member.

11. A device according to claim 9 characterized in that said piston chamber communicates with said valve chamber by means of a passage extending laterally through said piston chamber.

12. A device according to claim 9 characterized in that the passage from said valve chamber to said fluid outlet is formed by channels extending through the wall of said valve chamber near said fluid outlet, through the space occupied by said return spring and between the magnetic core and the solenoid encircling it disposed external of said chamber.

13. A device according to claim 2 characterized in that said valve member is the extension of a magnet core.

14. A device according to claim 13 characterized in that said magnet core communicates with said fluid inlet via a groove penetrating into the space between said magnet core and a solenoid encircling it.

15. A device according to claim 14 characterized in that the end of said magnet core which faces away from the valve member is in contact with a pressure spring and is arranged to be influenced thereby.

16. A device according to claim 15 characterized in that the dimensions and the stroke length of said valve member are considerably shorter than the corresponding dimensions and stroke length of said piston member.

* * * * *